United States Patent
Schroth et al.

(10) Patent No.: US 10,532,420 B2
(45) Date of Patent: Jan. 14, 2020

(54) RESISTANCE SPOT WELDING OF COPPER WORKPIECES

(71) Applicant: GM GLOBAL TECHNOLOGY OPERATIONS LLC, Detroit, MI (US)

(72) Inventors: James G. Schroth, Troy, MI (US); Thomas A. Perry, Bruce Township, MI (US); Hongliang Wang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 300 days.

(21) Appl. No.: 15/702,255

(22) Filed: Sep. 12, 2017

(65) Prior Publication Data

US 2019/0076953 A1    Mar. 14, 2019

(51) Int. Cl.
| B23K 11/11 | (2006.01) |
| --- | --- |
| B23K 11/16 | (2006.01) |
| B23K 11/18 | (2006.01) |
| B23K 35/22 | (2006.01) |
| B23K 35/30 | (2006.01) |
| B23K 103/12 | (2006.01) |

(52) U.S. Cl.
CPC ............ *B23K 11/115* (2013.01); *B23K 11/18* (2013.01); *B23K 35/222* (2013.01); *B23K 35/302* (2013.01); *B23K 2103/12* (2018.08)

(58) Field of Classification Search
CPC ...... B23K 11/11–12; B23K 11/16–166; B23K 11/18–185; B23K 2103/12; B23K 2103/22; B23K 35/22; B23K 35/007
See application file for complete search history.

(56) References Cited

U.S. PATENT DOCUMENTS

| 2002/0166843 | A1* | 11/2002 | Wang ..................... | B23K 11/115 |
| --- | --- | --- | --- | --- |
| | | | | 219/117.1 |
| 2008/0241572 | A1* | 10/2008 | Miyamoto ............ | B23K 11/115 |
| | | | | 428/600 |
| 2011/0097594 | A1* | 4/2011 | Tanaka .................. | B23K 11/115 |
| | | | | 428/594 |
| 2015/0231729 | A1* | 8/2015 | Yang ................... | B23K 35/0261 |
| | | | | 219/119 |
| 2015/0352659 | A1* | 12/2015 | Sigler ................... | B23K 11/115 |
| | | | | 219/91.2 |

(Continued)

*Primary Examiner* — Michael A Laflame, Jr.
(74) *Attorney, Agent, or Firm* — Reising Ethington P.C.

(57) ABSTRACT

A method of joining together adjacent overlapping copper workpieces by way of resistance spot welding involves providing a workpiece stack-up that includes a first copper workpiece and a second copper workpiece that lies adjacent to the first copper workpiece. The faying surface of the first copper workpiece includes a projection that ascends beyond a surrounding base surface of the faying surface and makes contact, either directly or indirectly, with an opposed faying surface of the second copper workpiece. Once provided, a compressive force is applied against the first and second copper workpieces and an electric current is passed momentarily through the first and second copper workpieces. The electric current initially flows through the projection to generate and concentrate heat within the projection prior to the projection collapsing. This concentrated heat surge allows a metallurgical joint to be established between the first and second copper workpieces.

20 Claims, 6 Drawing Sheets

(56) References Cited

U.S. PATENT DOCUMENTS

| | | | |
|---|---|---|---|
| 2016/0008912 A1* | 1/2016 | Schroth | B23K 35/302 |
| | | | 219/118 |
| 2017/0120367 A1* | 5/2017 | Chergui | B23K 11/115 |
| 2018/0009057 A1* | 1/2018 | Chergui | B23K 11/002 |
| 2018/0082764 A1* | 3/2018 | Wakamori | B23K 11/14 |

* cited by examiner

RESISTANCE SPOT WELDING OF COPPER WORKPIECES

Resistance spot welding relies on the resistance to the flow of an electric current through the bulk material and across the faying interface of overlapping metal workpieces to generate and concentrate heat. Ordinarily, the generated heat melts the overlapping metal workpieces to form a pool of comingled molten metal derived from each of the workpieces. The pool of molten metal extends into each of the adjacent metal workpieces and consumes the faying interface. Upon termination of the passing electric current, the pool of molten metal solidifies into a weld nugget that fusion welds the adjacent overlapping metal workpieces together. In practice, the momentary passage of the electric current is delivered through the overlapping metal workpieces by a set of spot welding electrodes that is clamped against opposite exposed surfaces of the metal workpieces so that the weld faces of the electrodes are facially aligned at the weld site. Resistance spot welding has long been used to fusion weld together stacks of steel workpieces and, more recently, stacks of aluminum alloy workpieces. Resistance spot welding is a popular joining procedure for these metals because it can be performed relatively quickly and inexpensively compared to other joining procedures.

Resistance spot welding has traditionally been considered an unworkable procedure for joining together copper workpieces. The high electrical conductivity of copper makes it difficult to generate resistive heat within the copper workpieces along the current flow path that extends between the facing spot welding electrodes. To be sure, the electrical conductivity of pure annealed copper at 20° C. is $5.80 \times 10^7$ S/m, and that value is used as a standard (100% IACS) by which the electrical conductivity of other materials is referenced on a percentage basis. By comparison, aluminum alloys are at least 35% less electrically conductive than copper, and steels are even less electrically conductive than aluminum alloys. Even the copper alloys typically used to construct the spot welding electrodes are more electrically resistive than copper. And, to the extent that enough current can be passed through overlapping copper workpieces to generate some resistive heat without thermally damaging the electrodes, that heat is rapidly disseminated as a result of the correspondingly high thermal conductivity of copper. Passing a large current through overlapping copper workpieces thus generally ends up broadly heating the copper workpieces relatively uniformly over an extended region as opposed to concentrating heat between the electrodes. Indeed, the delivery of a large electric current is more likely to weld the copper alloy spot welding electrodes to their respectively-engaged copper workpieces than it is to weld the copper workpieces together across their faying interface.

When copper workpieces need to be joined, the implemented joining procedure is usually selected from brazing, soldering, arc welding procedures such as MIG welding (GMAW), TIG welding (GTAW), and plasma arc welding (PAW), or electron beam welding. While each of these currently-available procedures can work under certain circumstances, there are general drawbacks to each procedure compared to resistance spot welding including, most notably, the need to supply heat to the joining location from an external source (e.g., a flame, an electric arc, a beam of high-velocity electrons, etc.). The heat added from the external source is intense enough to melt the copper workpieces or the filler material at the joining location. However, the added heat is difficult to precisely control and often results in excessive heat being introduced to the joining location, which makes it difficult to avoid thermal damage to any nearby heat-sensitive materials that may be present. The ability to target the generation of resistive heat within overlapping copper workpieces so that resistance spot welding can be implemented as a viable joining procedure would add a level of flexibility to manufacturing processes that call for copper-to-copper joining and would be particularly valuable in those instances where the protection of nearby heat-sensitive materials is an issue.

SUMMARY OF THE DISCLOSURE

A method of joining together adjacent overlapping copper workpieces by way of resistance spot welding may include several steps. In one step, a workpiece stack-up is provided that includes a first copper workpiece and a second copper workpiece that lies adjacent to the first copper workpiece. The first copper workpiece has a first faying surface and the second copper workpiece has a second faying surface that confronts the first faying surface to establish a faying interface. Moreover, the first faying surface includes a projection that ascends beyond a surrounding base surface of the first faying surface and makes contact with the second faying surface. In another step, a compressive force is applied against the first and second copper workpieces that urges the projection of the first faying surface against the second faying surface. In yet another step, an electric current is passed through the first and second copper workpieces. The electric current initially flows through the projection included on the first faying surface to generate and concentrate heat within the projection prior to the projection collapsing to bring the first faying surface and the second faying surface into broader interfacial contact along the faying interface of the first and second copper workpieces. Upon cooling of the first and second copper workpieces, a metallurgical joint is established between the first and second copper workpieces across their faying interface at a location where the projection collapsed.

The method of the aforementioned embodiment may include additional steps or be further defined. For example, the second faying surface of the second copper workpiece may also include a projection that ascends beyond a surrounding base surface of the second faying surface. Additionally, the projection of the first faying surface and the projection of the second faying surface may make contact with each other and be urged against each other when the compressive force is applied against the first and second copper workpieces. In that scenario, passing the electric current through the first and second copper workpieces may include initially flowing the electric current through the projections to generate and concentrate heat within the projections prior to the projections collapsing to bring the first faying surface and the second faying surface into broader interfacial contact along the faying interface of the first and second copper workpieces. As another example, an intervening reaction material may be disposed between the projection of the first faying surface and the second faying surface. The intervening reaction material may be a copper alloy that includes between 2.0 wt % and 10 wt % phosphorus.

Still further, the method of the aforementioned embodiment may comprise the step of delivering an electric current to a capacitor bank to store energy in the capacitor bank and the step of discharging the energy stored in the capacitor bank to provide the electric current that is passed momentarily through the first and second copper workpieces. Moreover, each of the first and second copper workpieces may be comprised of 99.9 wt % copper or greater. In another implementation, the method of the aforementioned embodiment may comprise the step of forming the projection on the first faying surface before the first copper workpiece and the second copper workpiece are assembled into the workpiece stack-up. The formation of the projection on the first faying surface may include mechanically deforming the first copper workpiece to displace material of the first copper workpiece into the projection. Or, in another technique, the formation of the projection on the first faying surface may include depositing a copper material onto the first copper workpiece to form the projection without mechanically deforming the first copper workpiece.

Another method of joining together adjacent overlapping copper workpieces by way of resistance spot welding may include several steps. In one step, at least one projection may be formed at a first faying surface of a first copper workpiece. The at least one projection of the first faying surface may ascend beyond a surrounding base surface of the first faying surface. In another step, a workpiece stack-up may be assembled that includes the first copper workpiece and a second copper workpiece that lies adjacent to the first copper workpiece. The at least one projection of the first faying surface of the first copper workpiece may make contact with a second faying surface of the second copper workpiece. In still another step, a compressive force may be applied against the first and second copper workpieces that urges the at least one projection of the first faying surface against the second faying surface. In yet another step, energy stored in a capacitor bank may be discharged to provide an electric current that rises to a peak current level of between 30 kA and 80 kA within a period of 2.0 ms to 10 ms and then decays over a time period of 5.0 ms to 20 ms before dropping to below 1 kA. In another step, a metallurgical joint may be formed between the first and second copper workpieces by passing the electric current through the first and second copper workpieces. The electric current initially flow through the at least one projection included on the first faying surface to generate and concentrate heat within the at least one projection prior to the at least one projection collapsing to bring the first faying surface and the second faying surface into broader interfacial contact. Upon cooling of the first and second copper workpieces, the metallurgical joint is established between the first and second copper workpieces across their faying interface at a location where the at least one projection collapsed.

The method of the aforementioned embodiment may include additional steps or be further defined. For instance, each of the first and second copper workpieces may be comprised of 99.9 wt % copper or greater. As another example, the aforementioned method may also include the step of forming at least one projection at the second faying surface of second copper workpiece. The at least one projection of the second faying surface may ascend beyond a surrounding base surface of the second faying surface. In that case, the step of assembling the workpiece stack-up may comprise bringing the at least one projection of the first faying surface and the at least one projection of the second faying surface into contact with one another so that applying the compressive force against the first and second copper workpieces urges the projections against one another. Also, the step of passing electric current through the first and second copper workpieces includes initially flowing the electric current through the projections to generate and concentrate heat within the projections prior to the projections collapsing.

Moreover, the aforementioned method may include the step of placing an intervening reaction material between first faying surface and the second faying so that the intervening reaction material is disposed between the projection of the first faying surface and the second faying surface upon assembling the first copper workpiece and the second copper workpiece into the workpiece stack-up. The intervening reaction material being a copper alloy that includes between 2.0 wt % and 10 wt % phosphorus. Indeed, in a specific application, the intervening reaction material may be a Cu—P—Ag alloy that includes copper and between 3 wt % and 8 wt % phosphorus and between 0.1 wt % and 20 wt % silver.

Still further, the step of forming the at least one projection on the first copper workpiece may include punching the first copper workpiece in which a punch is driven into the first copper workpiece from an opposite backside surface of the first copper workpiece to displace material of the first copper workpiece into the projection. As another option, the step of forming the at least one projection on the first copper workpiece may include depositing a copper material onto the first copper workpiece to form the projection without mechanically deforming the first copper workpiece.

Still another method of joining together adjacent overlapping copper workpieces by way of resistance spot welding may include several steps. In one step, at least one projection may be formed at a first faying surface of a first copper workpiece. The at least one projection of the first faying surface may ascend beyond a surrounding base surface of the first faying surface. In another step, a workpiece stack-up is assembled that includes the first copper workpiece and a second copper workpiece that lies adjacent to the first copper workpiece. The at least one projection of the first faying surface of the first copper workpiece may make contact with a second faying surface of the second copper workpiece through an intervening reaction material. The intervening reaction material may be a copper alloy that includes between 2.0 wt % and 10 wt % phosphorus and have an electrical conductivity that is lower than an electrical conductivity of each of the first and second copper workpieces. In yet another step, a compressive force is applied against the first and second copper workpieces that urges the at least one projection of the first faying surface against the second faying surface. In still another step, energy stored in a capacitor bank is discharged to provide an electric current that rises to a peak current level of between 30 kA and 80 kA within a period of 2.0 ms to 10 ms and then decays over a time period of 5.0 ms to 20 ms before dropping to below 1 kA. In another step, the electric current is passed through the first and second copper workpieces. The electric current may initially flow through the at least one projection included on the first faying surface to generate and concentrate heat within the at least one projection prior to the at least one projection collapsing to bring the first faying surface and the second faying surface into broader interfacial contact. The heat that is generated within the at least one projection may cause the intervening material layer to liquify and be laterally displaced between the first and second faying surfaces. Upon cooling of the first and second copper workpieces, a metallurgical joint may be established between the first and second copper workpieces across their faying interface at a location where the at least one projection collapsed.

The method of the aforementioned embodiment may include additional steps or be further defined. For instance, the method may include forming at least one projection at the second faying surface of second copper workpiece. The at least one projection of the second faying surface may ascend beyond a surrounding base surface of the second faying surface. In that case, the step of assembling the workpiece stack-up may comprise bringing the at least one projection of the first faying surface and the at least one projection of the second faying surface into indirect contact with one another through the intervening reaction material layer so that applying the compressive force against the first and second copper workpieces urges the projections against one another. Additionally, the step of passing the electric current through the first and second copper workpieces may include initially flowing the electric current through the at least one projection of the first faying surface and the at least one projection of the second faying surface to generate and concentrate heat within the projections prior to both of the projections collapsing to bring the first faying surface and the second faying surface into broader interfacial contact.

In another example, the method of the aforementioned embodiment may include additional steps. In one such additional step, the first copper workpiece may be contacted with a first copper alloy spot welding electrode. Likewise, in another additional step, the second copper workpiece may be contacted with a second copper alloy spot welding electrode that is facially aligned with the first copper alloy spot welding electrode. Moreover, the compressive force that is applied against the first and second copper workpieces is applied by pressing the first and second copper alloy spot welding electrodes against the first and second copper workpieces, respectively. Still further, the electric current may be passed through the first and second copper workpieces by exchanging the electric current between the first and second copper alloy welding electrodes located on opposite sides of the workpiece stack-up.

DETAILED DESCRIPTION

Figure 1:
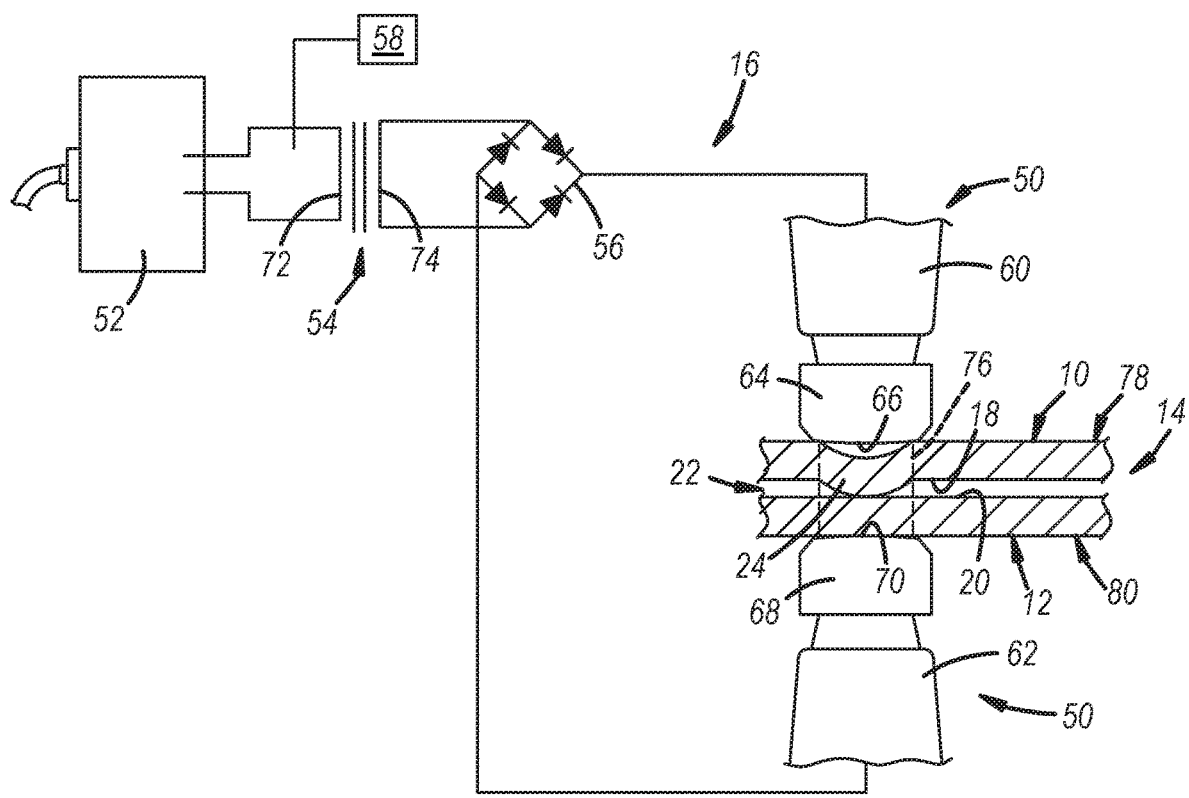
FIG. 1 is a schematic illustration of a workpiece stack-up, which includes a first copper workpiece and an adjacent overlapping second copper workpiece, and an embodiment of a resistance spot welding apparatus that can resistance weld the first and second copper workpieces together, and wherein at least a first faying surface of the first copper workpiece includes at least one projection according to one embodiment of the present disclosure.

A method of resistance spot welding copper workpieces is disclosed despite the high electrical and thermal conductivities of copper. The term "resistance spot welding" is used in the context of the presently-disclosed method to broadly refer to procedures in which an electric current is passed through overlapping copper workpieces to resistively generate the heat needed to facilitate joining of the copper workpieces across their faying interface. The generated heat may melt the copper workpieces and, thus, produce a fusion joint, or it may merely soften the copper workpieces to enable a solid-state joint to form. As part of the disclosed method, a projection is provided on a faying surface of at least one a pair of adjacent overlapping copper workpieces. The projection ascends beyond a surrounding base portion of the faying surface and serves to initially concentrate the current flow through the copper workpieces so that a relatively fast and targeted surge of heat is generated. This rapid heat surge is sufficient to form a metallurgical joint between the copper workpieces—either of the solid-state or fusion variety—while maintaining an overall low energy input. Additionally, in certain embodiments, an intervening reaction material may be disposed between the copper workpieces to facilitate the formation of the metallurgical joint and/or the electric current may be passed through the copper workpieces with the aid of capacitive discharge.

Referring now to FIGS. 1-10, a method of resistance spot welding a first copper workpiece 10 and a second copper workpiece 12 is illustrated. Here, a workpiece stack-up 14 that includes the first copper workpiece 10 and the second copper workpiece 12 is provided for resistance spot welding with a resistance spot welding apparatus 16. When assembled into the workpiece stack-up 14, the first copper workpiece 10 and the second copper workpiece 12 lie adjacent to one another and overlap at least to some extent. The first copper workpiece 10 includes a first faying surface 18 and the second copper workpiece 12 includes a second faying surface 20 that confronts the first faying surface 18. The overlapping and confronting faying surfaces 18, 20 establish a faying interface 22 between the first and second copper workpieces 10, 12. The faying interface 22 thus broadly refers to the confronting first and second faying surface 18, 20 of the first and second copper workpieces 10, 12 even though, as explained in more detail below, portions of those surfaces 18, 20 may initially be separated from one another by a gap prior to the passage of an electric current through the copper workpieces 10, 12. Each of the first and second copper workpieces 10, 12 may have a thickness 101, 121 that ranges from 1.0 mm to 4.0 mm.

Each of the first and second copper workpieces 10, 12 may be composed of unalloyed copper that includes a minimum of 99.3 wt % copper, and preferably a minimum of 99.9 wt % copper, with acceptable impurities constituting the remainder. Some examples of suitable unalloyed copper compositions include certain wrought and cast coppers. Suitable wrought coppers are those that are designated as C10100-C15760 copper and, in particular, include oxygen-free copper, oxygen-bearing copper, phosphorus-deoxidized copper, and free-machining copper. Suitable cast coppers are those that are designated as C80100-C81200. Additionally, each of the first and second copper workpieces 10, 12 may be composed of a high-copper alloy that includes between 94 wt % and 99.2 wt % copper with one or more alloying elements constituting the remainder. The one or more alloying elements may be selected from Cr, Zr, Mg, Fe, P, Be, Co, S, Te, and Pb. Suitable wrought high-copper alloys are commonly designated as C16200-C19750 and suitable cast high-copper alloys are commonly designated as C81300-C82800. The term "copper workpiece" as used herein thus encompasses a workpiece composed of unalloyed copper or a high-copper alloy. The first and second copper workpieces 10, 12 may both be composed of unalloyed copper, may both be composed of a high-copper alloy, or one of the copper workpieces 10, 12 may be composed of unalloyed copper while the other copper workpiece 10, 12 is composed of a high-copper alloy.

Figure 2:
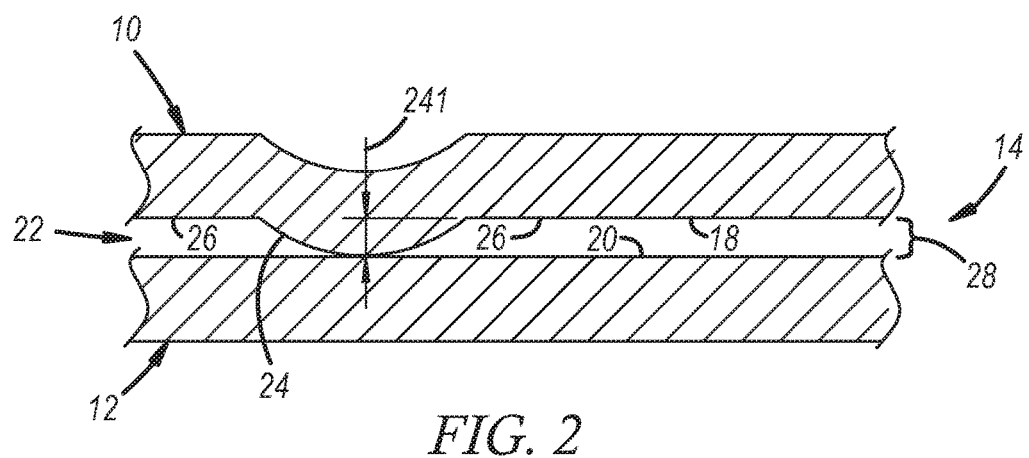
FIG. 2 is a magnified view of the workpiece stack-up illustrated in FIG. 1 according to one embodiment of the present disclosure isolated from the resistance spot welding apparatus.

The first copper workpiece 10 may include at least one projection 24 on the faying surface 18, as shown best in FIG. 2. The projection 24 ascends beyond a surrounding base surface 26 of the first faying surface 18 and makes contact with the second faying surface 20, either directly or indirectly, such that a gap 28 is imposed between the first and second faying surfaces 18, 20 outboard of the projection 24. Direct contact between the projection 24 and the second faying surface 20 occurs when there is physical contact between the projection 24 and the second faying surface 20. Indirect contact between the projection 24 and the second faying surface 20 occurs when an intervening material is present between the projection 24 and the second faying surface 20 yet there is continuity of contact (i.e., no gaps) from the projection 24 to the intervening material to the second faying surface 20. The projection 24 may assume a multitude of shapes and contours. For example, as shown here in FIG. 2, the projection 24 may be hemispherical in shape. In other embodiments, however, and as will be further described below, the projection 24 may be spherical, pyramidal, conical, frustoconical, ringed, or any other conceivable shape that extends beyond the surrounding base surface 26 and is able to impose the gap 28 between first and second faying surfaces 18, 20 outside of the projection 24. In certain applications, the projection 24 may ascend beyond a surrounding base surface 26 of the first faying surface 18 to a height 241 of at least 0.5 mm. More narrowly, the projection 24 may be a convex dome having a height 241 between 0.5 mm and 2.5 mm and a diameter along the surrounding base surface 26 of 0.5 mm to 2.0 mm.

Figure 3:
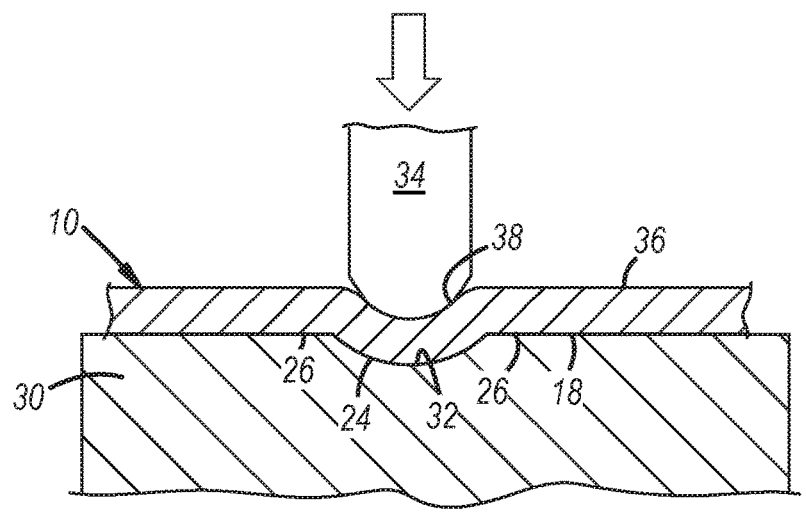
FIG. 3 is a generalized illustration depicting a punching operation that may be used according to one embodiment of the present disclosure to form the at least one projection on the first faying surface (or the first and second faying surfaces) by mechanically deforming and displacing material of the first copper workpiece (or the first and second copper workpieces)

The projection 24 may be formed in the first faying surface 18 in accordance with numerous possibilities. More specifically, and depending on several factors including the desired shape and contour, the projection 24 may be formed by mechanically deforming the first copper workpiece 10, by depositing a copper material onto the copper workpiece 10, or otherwise. In regards to first option, the first copper workpiece 10 may be mechanically deformed to displace material of the first copper workpiece 10 into the projection 24. As shown in FIG. 3, for example, the projection 24 may be formed by a punching operation. In a punching operation, the first copper workpiece 10 is supported on a support substrate 30, such as an anvil, that includes an indentation 32 having a complimentary shape to the projection being formed. A punch 34 is driven into the first copper workpiece 10 from a backside surface 36 of the first copper workpiece 10. The punch 34 impresses into and plastically deforms the first copper workpiece 10 while forcing material of the first copper workpiece 10 into the indentation 32. In doing so, material of the copper workpiece is displaced beyond the base surface 26 of the first faying surface 18 on the opposite side of the workpieces 10 in the shape of the punch 34 to produce the projection 24. The punch 34 is then retracted, leaving an impression 38 in the backside surface 36 behind the projection 24, and the first copper workpiece 10 is removed from the support substrate 30.

Figure 4:
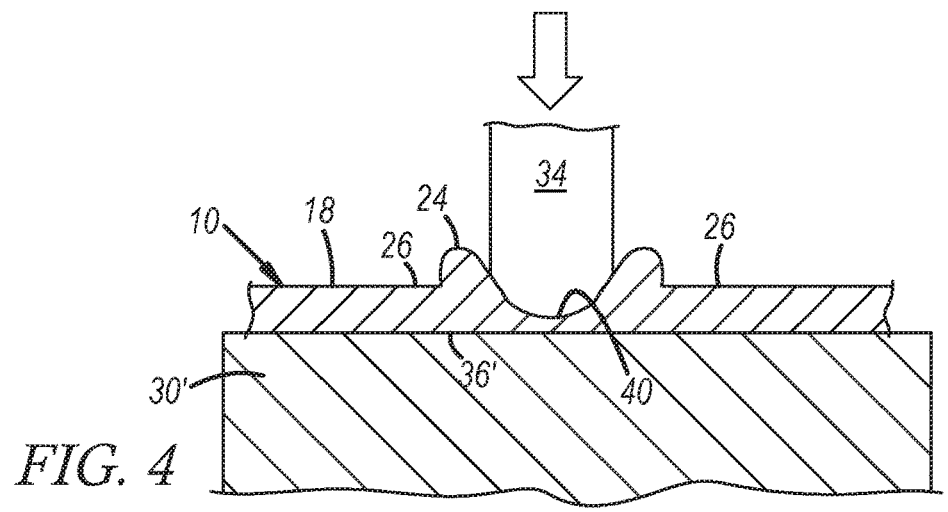
FIG. 4 is a generalized illustration depicting another punching operation that may be used according to one embodiment of the present disclosure to form the at least one projection on the first faying surface (or the first and second faying surfaces) by mechanically deforming and displacing material of the first copper workpiece (or the first and second copper workpieces)
Figure 5:
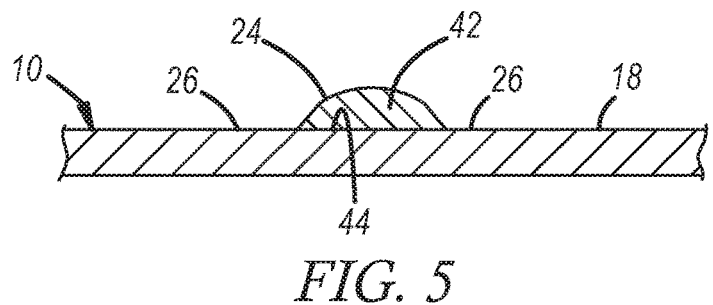
FIG. 5 is a generalized illustration depicting the deposition of a copper material according to one embodiment of the present disclosure to form the at least one projection on the first faying surface (or the first and second faying surfaces) without mechanically deforming the first copper workpiece (or the first and second copper workpieces)

The projection 24 can also be formed by other avenues that rely on the mechanical deformation of the first copper workpiece 10 and the displacement of material into the projection 24. In one alternative approach, as shown in FIG. 4, the same punching operation described above may be carried out, except that an indentation is not present within the support substrate 30'. In this way, the backside surface 36' of the first copper workpiece 10 is supported on the support substrate 30' and the punch 34 is driven into the first faying surface 18. The punch 34 impresses into and plastically deforms the first copper workpiece 10, as before, but here material from the copper workpiece 10 is displaced up and around the punch 34 in the opposite direction of the force of the punch 34 since the backside surface 36 of the workpiece 10 is fully supported against the support substrate 30'. As a result, material of the copper workpiece is displaced beyond the base surface 26 of the first faying surface 18 in the shape of a protruding ring that surrounds an intruding depression 40. Still other avenues may be employed despite not being shown here including, as one option, mechanical upsetting.

As noted above, the projection 24 may also be formed by depositing copper material onto the copper workpiece 10. This option may be employed if it is desired to simply add the projection 24 to the first faying surface 18 without having to mechanically deform the first copper workpiece 10. As shown, for example, in FIG. 5, a copper material 42 (composed of either unalloyed copper or a high-copper alloy) may be deposited onto the first copper workpiece 10 such that it rises beyond the surrounding base surface 26 of the first faying surface 18 to form the projection 24. The copper material 42 may assume any of a wide variety of shapes and contours and may be secured to the first copper workpiece 10 through an interfacial joint 44 such as a braze joint or a solid-state joint. Several procedures are available for depositing the copper material 42 onto the first copper workpiece 10 as the projection 24 including the cold metal transfer process that employs oscillating wire arc welding as disclosed in US2016/0008911, the entire contents of which are incorporated herein by reference. As another example, the copper material 42 may be deposited using vacuum ball tack welding. Still further, other options exist for forming the projection 24 that do not rely on mechanical deformation or the deposition of the copper material 42. These other options may include laser scoring or chemical etching of the first copper workpiece 10 to form the projection 24 at the first faying surface 18.

Figure 6:
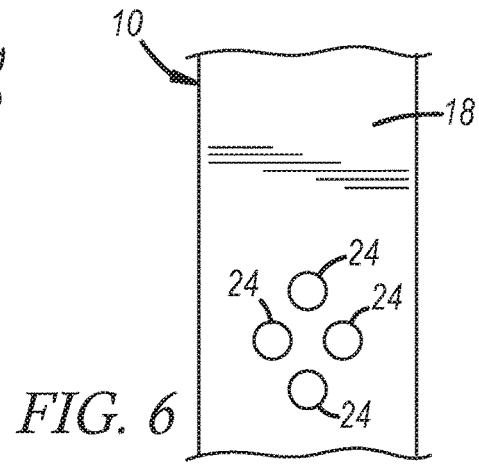
FIG. 6 is a plan view of the first faying surface of the first copper workpiece, which includes a plurality of projections according to one embodiment of the present disclosure.
Figure 7:
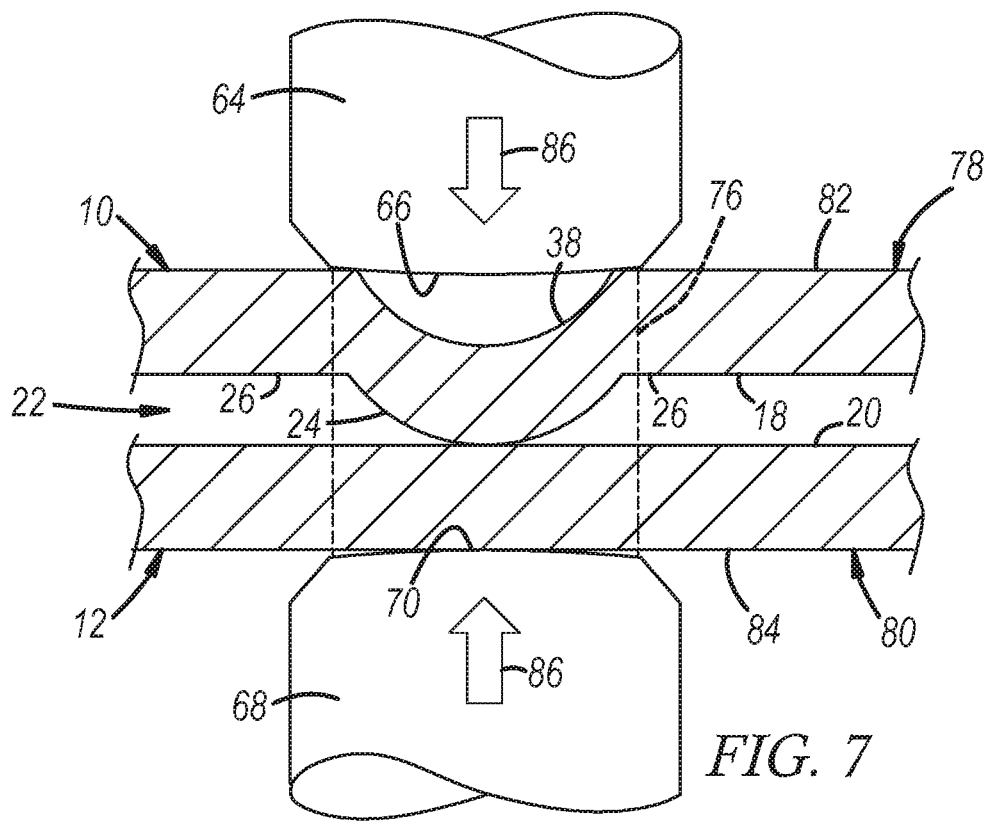
FIG. 7 depicts the first and second spot welding electrodes of the weld gun being pressed against the opposite sides of the stack-up to apply a compressive force against the workpieces at the joining according to one embodiment of the present disclosure.

More than one projection 24 may be formed on the first faying surface 18 of the first copper workpiece 10, if desired, as illustrated representatively in FIG. 6. Indeed, a plurality of projections 24 may be present, each of which may be the same or different from the other of the plurality of projections 24. For example, as shown here, four projections 24 of similar shapes and contours may be formed on the first faying surface 18 in a diamond arrangement, although more or less projections 24 may certainly be present in any of a variety of specified or random arrangements. In certain preferred applications, anywhere from two to ten, or more narrowly from three to six, projections 24 may be formed at the first faying surface 18. All of the plurality of projections 24 may be independently formed at the first faying surface 18 by any of the procedures discussed above. Additionally, if all of the plurality of projections 24 are intended to be similarly constructed, the first copper workpiece 10 may be mechanically deformed by rolling a cylindrical tool with a knurled surface over the first copper workpiece 10 to form the plurality of projections 24 on the first faying surface 18 in a single step as opposed to individually forming the several projections 24.

The disclosed method utilizes the at least one projection 24 formed on the first faying surface 18 of the first copper workpiece 10 to render the first and second copper workpieces 10, 12 resistance spot weldable. To that end, the disclosed process involves providing the workpiece stack-up 14 in its assembled state. Once the workpiece stack-up 14 is provided, a compressive force is applied against the first and second copper workpieces 10, 12 that urges the projection 24 of the first faying surface 18 against the second faying surface 20 either directly or through an intervening material, and an electric current is passed through the first and second copper workpieces 10, 12. This electric current initially flows through the projection 24 to generate and concentrate heat within the projection(s) 24 as opposed to broadly within the first and second copper workpieces 10, 12. The heat generated within the projection 24 eventually causes the projection 24 to collapse under the applied compressive force. As a result, the first faying surface 18 and the second faying surface 20 are brought into broader interfacial contact along their faying interface 22, at which point the faying surfaces 18, 20 interact either through sintering or the intermingling of molten copper. Eventually, the passage of the electric current through the first and second copper workpieces 10, 12 is terminated to cool the workpieces 10, 12. Upon cooling, a metallurgical joint is established between the first and second copper workpieces 10, 12 across their faying interface 22 at a location where the projection 24 collapsed.

Referring back to FIG. 1, the resistance spot welding apparatus 16 shown is one particular device that can carry out the disclosed method. The resistance spot welding apparatus 16 includes a weld gun 50 (partially shown), a power supply 52, a transformer 54, a rectifier 56 and a weld controller 58. The weld gun 50 may be carried on a robot or mounted on a stationary a pedestal. The weld gun 50 includes a first gun arm 60 and a second gun arm 62 that are mechanically moveable towards and away from each other. These gun arms 60, 62 can be arranged in a C-type configuration, an X-type configuration, or some other configuration. The first gun arm 60 retains a first spot welding electrode 64 having a first weld face 66 and the second gun arm 60 retains a second spot welding electrode 68 having a second weld face 70. Each of the first and second spot welding electrodes 64, 68 may be formed of a copper alloy such as a zirconium copper alloy (ZrCu) that contains about 0.10 wt % to about 0.20 wt % zirconium and the balance copper. Copper alloys that meet this constituent composition and are designated C15000 are preferred. Other copper alloy compositions that possess suitable mechanical and electrical conductive properties may also be employed. Additionally, a mechanism for supplying the first and second welding electrodes 64, 68 with cooling water is typically incorporated into the gun arms 60, 62 to manage the temperatures of the spot welding electrodes 64, 66 when in use.

The power supply 52, the transformer 54, and the rectifier 56 electrically communicate with the first and second spot welding electrodes 62, 66 and supply the electric current that is exchanged between the electrodes 64, 68 during welding. The power supply 52 receives a three phase mains AC current and provides a high-voltage input AC current for delivery to the transformer 54. For example, the mains AC current may first be rectified and then inverted within the power supply 52 to produce a single-phase input AC current, usually a square wave AC current, of higher voltage. The input AC current is fed to a primary winding 72 of the transformer 54, usually at 1000 Hz, which creates a magnetic flux that induces a lower-voltage, higher-amperage AC current in a secondary winding 74 of the transformer 54. The AC current in the secondary winding 74 is then fed to the rectifier 56 where a collection of semiconductor diodes converts the supplied AC current into a low-ripple DC current suitable for delivery as the electric current through the first and second spot welding electrodes 64, 68. The transformer 54 and the rectifier 56 may be combined into a single package such as a medium-frequency direct-current (MFDC) welder, which is commercially available from a number of sources including ARO Welding Technologies (US headquarters in Chesterfield Township, Mich.) and Bosch Rexroth (US headquarters in Charlotte, N.C.).

The weld controller 58 controls the manner in which the electric current is delivered between the first and second spot welding electrodes 64, 68. The weld controller 58 may interface with the transformer 54 and allows a user to input a weld schedule that sets and manages the waveform of the electrical current being exchanged between the spot welding electrodes 64, 68 over the course of a welding event. The weld controller 58 may be set to administer the electric current at a constant current level or it may be set to administer the electric current as a series of current pulses that may have constant or increasing peak current levels over time. Any of a wide variety of weld schedules may be implemented by the weld controller 58 depending on the composition of the first and second copper workpieces 10, 12, the thicknesses of the first and second copper workpieces 10, 12, the size and shape of the projection 24, the number of projections 24, and whether or not an intervening reaction material layer (discussed below) is present between the first and second copper workpieces 10, 12, among other factors.

Still referring to FIG. 1, the disclosed method is performed using the resistance spot welding apparatus 16 by, first, providing the workpiece stack-up 14. The workpiece stack-up 14 may be provided by assembling the stack-up 14, which may entail bringing the first and second copper workpieces 10, 12 together such that the workpieces 10, 12 overlap and their respective faying surfaces 18, 20 confront each other so that the at least one projection 24 on the first faying surface 18 makes contact (either direct or indirect) with the second faying surface 20 at a joining location 76 where a metallurgical joint (FIG. 10) is ultimately established. The first and second copper workpieces 10, 12 may be assembled and held together as the workpiece stack-up 14 using suitable fixturing equipment or other process hardware. After the workpiece stack-up 14 is provided in its assembled state, the stack-up 14 is positioned relative to the weld gun 50 between the first and second spot welding electrodes 64, 68 in preparation for welding. This may involve robotically moving the weld gun 50 in spatial relation to the workpiece stack-up 14 or bringing the workpiece stack-up 14 to the weld gun 50 depending on how the overall process is designed.

Once in position, the first and second spot welding electrodes 64, 68 are used to pass the electric current through the workpiece stack-up 14 and across the faying interface 22 of the adjacent overlapping copper workpieces 10, 12 at the joining location 76. In that regard, the weld gun 50 is operated to converge the first and second spot welding electrodes 64, 68 against opposite first and second sides 78, 80 of the workpiece stack-up 14, as shown best in FIG. 7, with the first side 78 of the stack-up 14 being provided by an exposed back surface 82 of the first copper workpiece 10 (which is the same surface as the backside surface 36, 36' referred to in FIGS. 3-4) and the second side of the stack-up 14 being provided by an exposed back surface 84 of the second copper workpiece 12. In particular, the first weld face 66 of the first spot welding electrode 64 is pressed against the exposed back surface 82 of the first copper workpiece 10 and the second weld face 70 of the second welding electrode 68 is pressed against the exposed back surface 84 of the second copper workpiece 12 in facial alignment with one another. The first weld face 66, as shown, may at least partially cover any impression 38 left in the exposed back surface 82 of the first copper workpiece 10 behind the projection 24 as a result of the procedure used to form the projection (e.g., punching).

The convergence of the first and second spot welding electrodes 64, 68 against the first and second copper workpieces 10, 12, respectively, applies a compressive force 86 against the workpieces 10, 12 at the joining location 76. The compressive force 86 urges the projection 24 at the first faying surface 18 against the second faying surface 20 either directly or indirectly through an intervening material. The imposed compressive force 86 applied by the first and second spot welding electrodes 64, 68 preferably ranges from 250 lbf (pounds force) to 1000 lbf or, more narrowly, from 350 lbf to 500 lbf. Once the compressive force 86 has been attained, an electric current is passed between the first and second spot welding electrodes 64, 68 and through the first and second copper workpieces 10, 12. This electric current is preferably a DC electric current supplied from the rectifier 56 associated with the weld gun 50. The electric current may be constant or pulsed over time according to a weld schedule that is controllable by the weld controller 58. In one particular embodiment, however, the electric current is passed at a constant current level ranging from 25 kA to 35 kA, as shown in the weld schedule depicted in FIG. 8. The electric current may take from 5 ms to 20 ms to reach its constant current level and may then be maintained nominally at that current level for a period of time ranging from 30 ms to 100 ms before dropping to 0 kA.

The electric current that is passed through the first and second copper workpieces 10, 12 initially flows through the projection 24 included on the first faying surface 18 since that is the only direct electrical pathway between the copper workpieces 10, 12 within the joining location 76 at the time current flow is commenced. The initial flow of the electric current through the projection 24 increases the current density of the passing electric current across the faying interface 22 the first and second copper workpieces 10, 12 by a factor of ten or more compared to the current density of the electric current at the interfaces of the weld faces 66, 70 and their respective backside surfaces 82, 84 of the first and second copper workpieces 10, 12. The increased current density attained in the projection 24 generates and concentrates heat within the projection 24 so long as the projection 24 is structurally intact. This concentrated heat surge at least softens, and may even melt, the projection 24 as well as the immediately surrounding regions of the first and second faying surfaces 18, 20.

Figure 9:
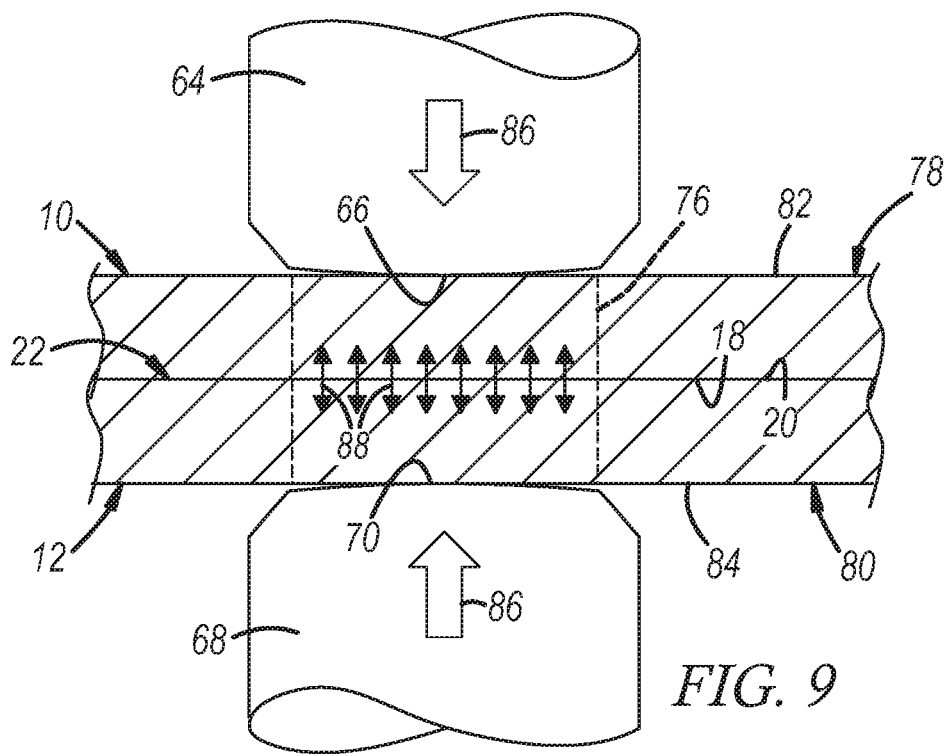
FIG. 9 depicts the first and second spot welding electrodes of the weld gun being pressed against the opposite sides of the stack-up to apply a compressive force against the workpieces at the joining location after the at least one projection at the first faying surface (or the first and second faying surfaces) has collapsed and the first and second faying surfaces have been brought into broader interfacial contact according to one embodiment of the present disclosure.

During the passage of the electric current through the first and second copper workpieces 10, 12, and as a consequence of the locally concentrated heat generated within the projection 24 at least initially, the projection 24 collapses and the first and second faying surfaces 18, 20 are brought into broader interfacial contact along the faying interface 22 of the copper workpieces 10, 12, as shown in FIG. 9, which negates the sharp increase in the current density that previously existed prior to the collapse of the projection 24. At the time the projection 24 collapses, and while current may still be flowing, the first and second faying surfaces 18, 20 interact (generally represented by arrows 88) in a way that will lead to the establishment of a metallurgical joint. Such interaction between the first and second faying surfaces 18, 20 may be in the form of solid-state particle softening and diffusion without melting either of the first and second copper workpieces 10, 12 or it may involve melting each of the first and second copper workpieces 10, 12 at their contacting faying surfaces 18, 22 such that the melted portions of the faying surfaces 18, 22 consume the faying interface 22 and comingle into a common pool that extends into each of the copper workpieces 10, 12.

Figure 10:
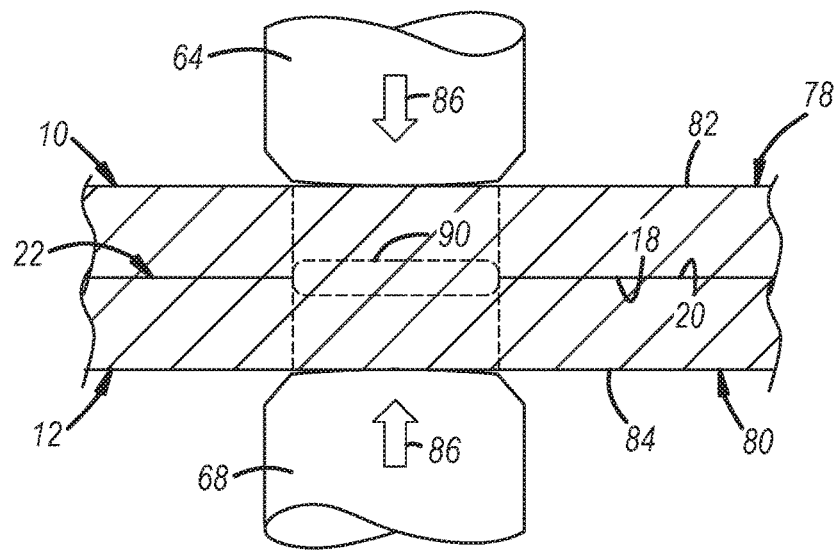
FIG. 10 depicts the first and second copper workpieces and a metallurgical joint that has been established between the between the first and second copper workpieces across their faying interface at the joining location where the at least one projection was initially present and later collapsed according to one embodiment of the present disclosure.

The passage of the electric current through the first and second copper workpieces 10, 12 eventually ceases. When current flow ceases, the first and second copper workpieces 10, 12 cool relatively quickly due to their high thermal conductivities. Upon cooling, a metallurgical joint 90 in the form of a solid-state joint or a fusion joint is established between the first and second copper workpieces 10, 12 across their faying interface 22 at the joining location 76 where the projection 24 was initially present and later collapsed, as depicted in FIG. 10. The metallurgical joint 90 is established because of the interaction 88 that occurs between the first and second faying surfaces 18, 20 as a result of the concentration of heat within the projection 24 and the immediately surrounding portions of the faying surfaces 18, 20. After the metallurgical joint 90 is established, the weld gun 50 retracts the first and second spot welding electrodes 64, 68 and now joined workpiece stack-up 14 is removed from the spot welding apparatus 16 or reoriented relative to the weld gun at another location where welding is desired in the same way.

Figure 11:
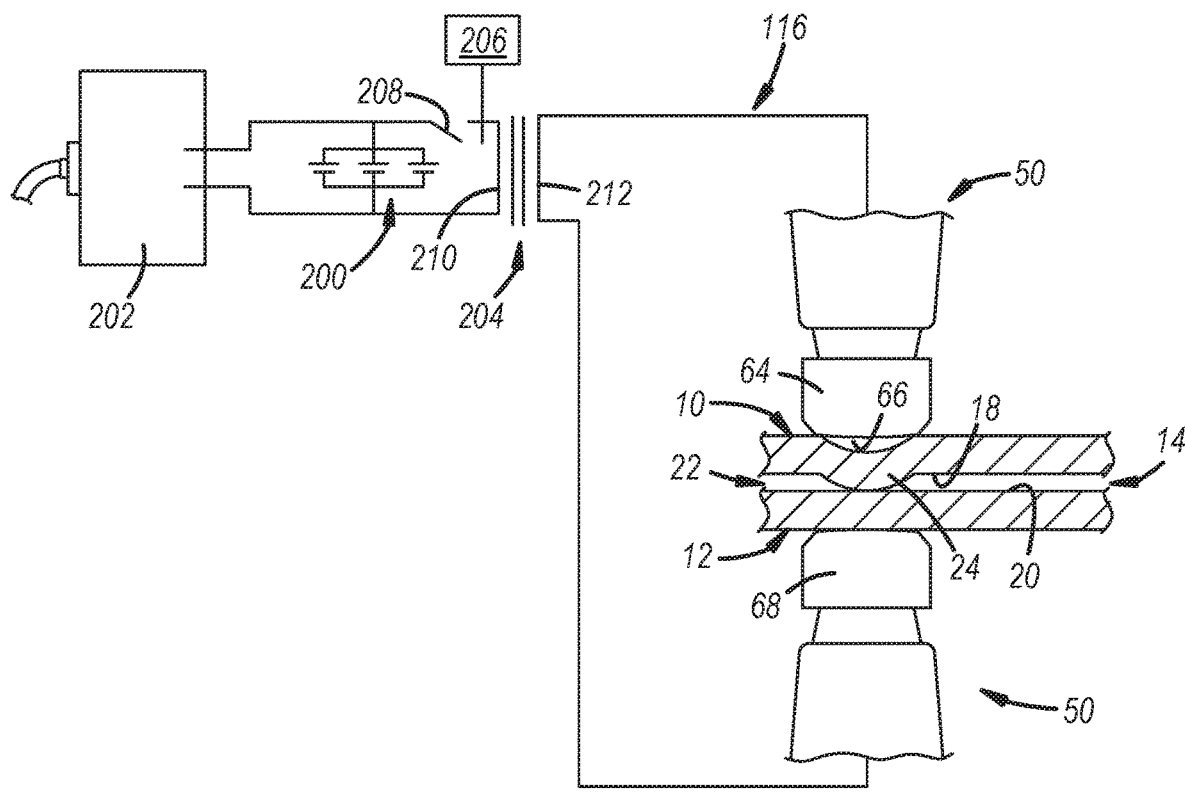
FIG. 11 is a schematic illustration of a workpiece stack-up, which includes a first copper workpiece and an adjacent overlapping second copper workpiece, and another embodiment of a resistance spot welding apparatus that can resistance weld the first and second copper workpieces together, and wherein at least a first faying surface of the first copper workpiece includes at least one projection according to one embodiment of the present disclosure.

The embodiment of the disclosed method described above is carried out using at least one projection 24 on the first faying surface 18 and a standard construction for the weld gun 52. While this is feasible, other embodiments are certainly possible including those described below in connection with FIGS. 11-15. In the embodiments described below, like numerals are used to identify corresponding features and, accordingly, the description above regarding those corresponding features applies equally below unless otherwise stated. In one particular embodiment, as shown in FIG. 11, the resistance spot welding apparatus, which is identified here by reference numeral 116, may include a capacitor bank 200 so that the electric current can be passed between the first and second copper workpieces 10, 12 more suddenly than in the embodiment described above. The capacitor bank 200 includes a plurality of capacitors that are connected in series or in parallel and are able to store energy in the form of an electric field. This energy can later be discharged to provide the electric current that passes through the first and second copper workpieces 10, 12, albeit more rapidly than in the standard weld gun configuration illustrated in FIG. 1, using the same weld gun 50.

In the embodiment of FIG. 11, for example, the resistance spot welding apparatus 116 includes a power supply 202, the capacitor bank 200, a pulse transformer 204, and a weld controller 206. The power supply 202 receives a three phase mains AC current and provides a high-voltage input DC current to the capacitor bank 200. For example, the mains AC current may be passed through a high-voltage transformer and rectified within the power supply 202 to produce the high-voltage input DC current. The input DC current, in turn, is fed to the capacitor bank 200 to accumulate and store energy. When an electric current is needed for passage through the first and second copper workpieces 10, 12, a switch 208 (e.g., an IGBT, an SCR, etc.) is closed and the energy stored in the capacitor bank 200 is discharged rapidly into a primary winding 210 of the pulse transformer 204, which creates a magnetic flux that induces a lower-voltage, higher-amperage DC current pulse in a secondary winding 212 of the transformer 204 suitable for delivery as the electric current through the first and second spot welding electrodes 64, 68. The capacitor bank 200 and the pulse transformer 204 may be combined into a single package known as a capacitive discharge welder, which is commercially available from a number of sources including T.J. Snow Company (Chattanooga, Tenn.). The weld controller 206 may interface with the pulse transformer 204 to control the manner in which the electric current is delivered between the first and second spot welding electrodes 64, 68.

Figure 8:
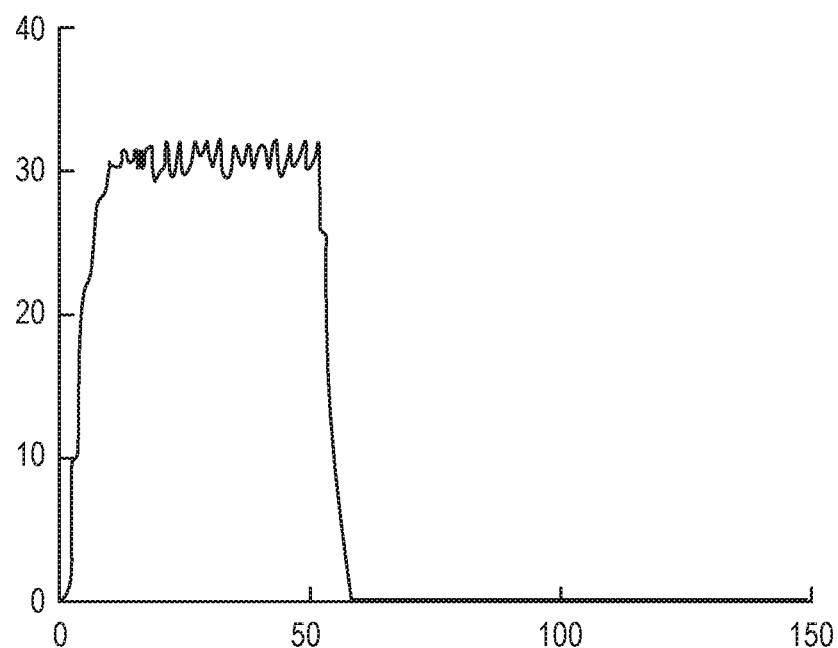
FIG. 8 illustrates one possible weld schedule that may be employed using the resistance spot welding apparatus depicted in FIG. 1 according to one embodiment of the present disclosure, wherein the y-axis is current level in kiloamperes (kA) and the x-axis is time in miliseconds (ms)
Figure 12:
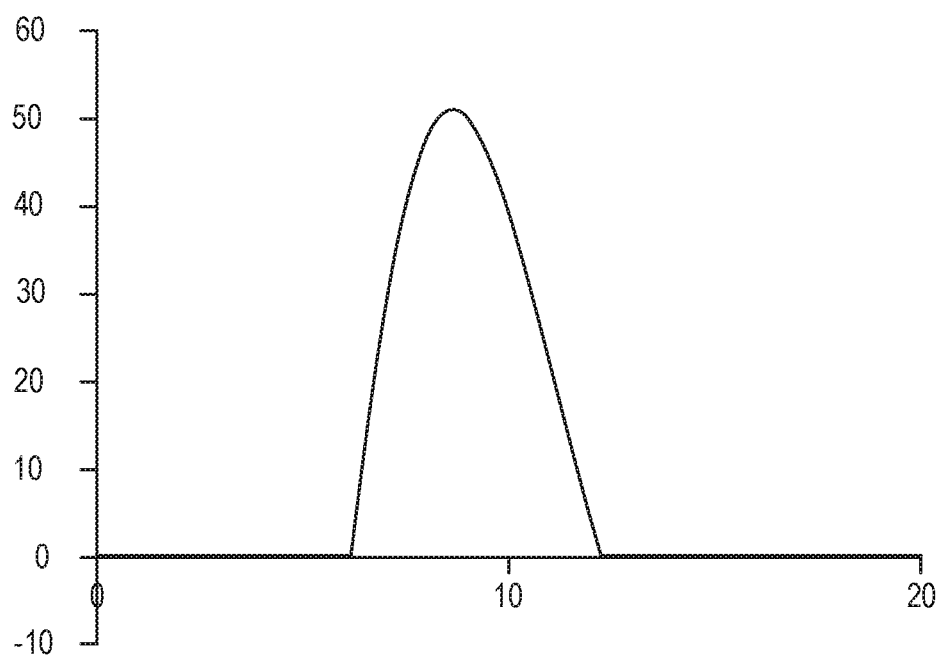
FIG. 12 illustrates one possible weld schedule that may be employed using the resistance spot welding apparatus depicted in FIG. 11 according to one embodiment of the present disclosure, wherein the y-axis is current level in kiloamperes (kA) and the x-axis is time in miliseconds (ms)

When capacitive discharging is used to generate the electric current supplied to the first and second spot welding electrodes 64, 68 and passed through the first and second copper workpieces 10, 12, the electric current spikes to a higher peak current level over a shorter time period compared to the current profile typically produced using the resistance spot welding apparatus 16 of FIG. 1 as exemplified by the weld schedule shown in FIG. 8. For instance, in a representative embodiment, the electric current that is passed on account of discharging capacitor bank 190 may rise to a peak current level ranging from 30 kA to 80 kA over a time period of 2.0 ms to 10 ms, as shown in the weld schedule depicted in FIG. 12. The electric current may then fall or decay over a time period of 5.0 ms to 20 ms before dropping to below 1.0 kA. The shorter duration of the electric current that is passed through the first and second copper workpieces 10, 12 using capacitive discharging is noteworthy because it may result in a reduced energy input into the workpieces 10, 12 even though the electric current briefly spiked to a higher current level. The resistance spot welding apparatus 116 and its use of capacitive discharge to provide the electric current that is passed through the first and second copper workpieces 10, 12 may thus have the advantage of establishing the metallurgical joint 90 (FIG. 10) between the workpieces 10, 12 while minimizing the chance that nearby heat-sensitive materials will be thermally damaged.

Figure 13:
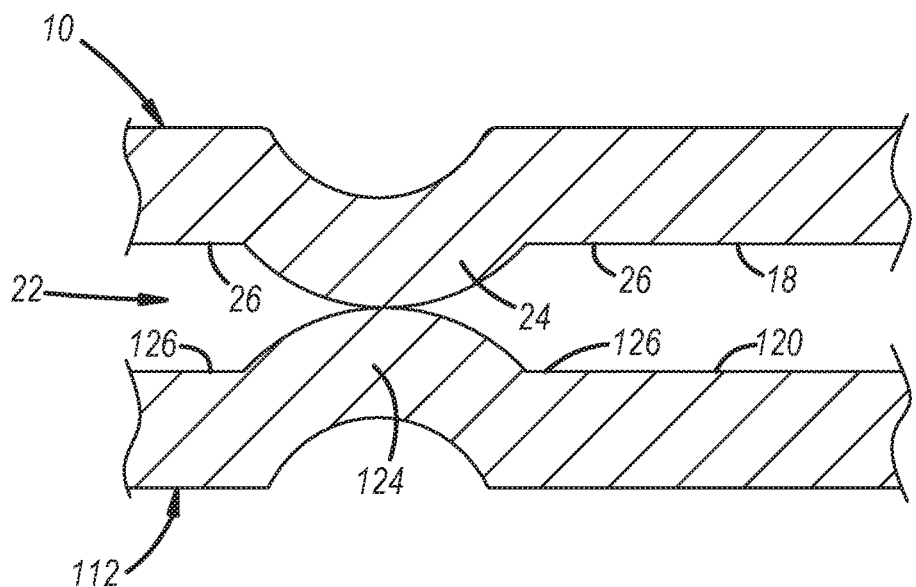
FIG. 13 depicts the first and second copper workpieces from the same vantage as FIG. 2 although, here, the second faying surface of the second copper workpiece also includes at least one projection along with the first faying surface according to one embodiment of the present disclosure.

In yet another embodiment, and referring now to FIG. 13, the second faying surface of the second copper workpiece, which are respectively identified by reference numerals 120 and 112, may also include at least one protrusion 124. Like the at least one projection 24 at the first faying surface 18, the at least one projection 124 at the second faying surface 120 ascends beyond a surrounding base surface 126 of the second faying surface 120 and makes contact with the first faying surface 18, either directly or indirectly. The projection 124 on the second faying surface 120 may make contact with the first faying surface 18 at the projection 24 of the first faying surface 18 or the projections 24, 124 may be offset from one another. By employing the projection 124 on the second faying surface 120 in conjunction with the projection 24 on the first faying surface 18, the concentration of heat within the joining location 76 can be more pronounced up until the projections 24, 124 collapse to bring the first and second faying surfaces 18, 20 into broader interfacial contact along the faying interface 22. The projection 124 included at the second faying surface 120 may be formed by any of the procedures described above in connection with FIGS. 3-5. Also, as with the projection 24 on the first faying surface 18, the projection 124 on the second faying surface may include a plurality of projections 124.

Here, in the embodiment shown in FIG. 13, the projection 24 of the first faying surface 18 and the projection 124 of the second faying surface 120 make contact with each other (directly or indirectly through an intervening material) and are urged against each other when the compressive force 86 (FIG. 7) is applied against the first and second copper workpieces 10, 112. Consequently, when the electric current is passed between the first and second copper workpieces 10, 112, the current initially flows through each of the projections 24, 124 since that is the only direct electrical pathway between the copper workpieces 10, 112 within the joining location 76 at the time current flow is commenced. The initial flow of the electric current through the projections 24, 124 generates and concentrates heat within the projections 24, 124. This concentrated heat surge at least softens, and may even melt, each of the projections 24, 124 as well as the immediately surrounding regions of the first and second faying surfaces 18, 20. The concentrated heat eventually causes each of the projections 24, 124 to collapse. At the time projections 24, 124 collapse, and while current is still flowing, the first and second faying surfaces 18, 20 interact as previously explained and a metallurgical joint similar to the joint 90 shown in FIG. 10 is established upon cooling of the first and second copper workpieces 10, 112.

Figure 14:
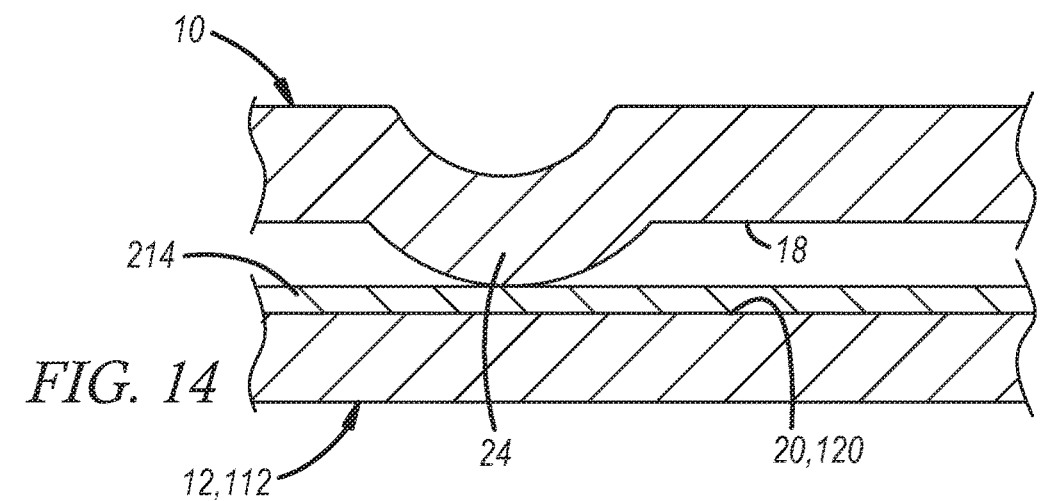
FIG. 14 depicts the first and second copper workpieces from the same vantage as FIG. 2 in addition to an intervening reaction material that is placed between the first faying surface and the second faying surface to help facilitate the establishment of the metallurgical joint according to one embodiment of the present disclosure.

In still another embodiment, and as shown in FIG. 14, an intervening reaction material 214 may be placed between the first faying surface 18 and the second faying surface 20, 120 to help facilitate the establishment of the metallurgical joint 90. The intervening reaction material layer 214 is a copper alloy that has a lower electrical conductivity (i.e., is more electrically resistive) than each of the first and second copper workpieces 10, 12, 112 and, preferably, includes between 2.0 wt % and 10 wt % phosphorus. In one specific embodiment, the intervening reaction material 214 may be a Cu—P—Ag copper alloy that includes copper and between 3 wt % and 8 wt % phosphorus and between 0.1 wt % and 20 wt % silver. The intervening reaction material 214 may be arranged between the first and second faying surfaces 18, 20, 120 in the form of a deposited material layer, a foil, a tape, or any other applicable constitution. The placement of the intervening reaction material 214 between the first and second faying surfaces 18, 20, 120—together with the at least one projection 24, 124 on the first faying surface 18 or the first and second faying surfaces 18, 120—enables the metallurgical joint 90 to be formed while passing the electric current at a moderate current level for a relatively short period of time, which in turn, can reduce the energy input into the first and second copper workpieces 10, 12.

Figure 15:
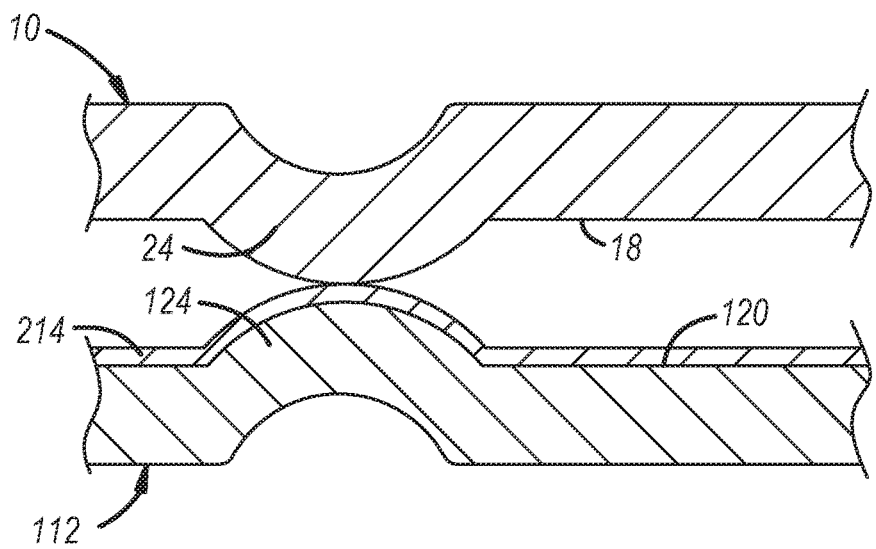
FIG. 15 depicts the first and second copper workpieces from the same vantage as FIG. 2 in addition to an intervening reaction material that is placed between the first faying surface and the second faying surface to help facilitate the establishment of the metallurgical joint according to another embodiment of the present disclosure.

The intervening reaction material 214 is placed between the first faying surface 18 and the second faying surface 20, 120 such that the material 214 is disposed between the projection 24 on the first faying surface 18 and the second faying surface 20, 120. In that regard, if the second faying surface 120 includes the at least one projection 124, the intervening reaction material 214 may be disposed between the at least one projection 24 of the first faying surface 18 and the at least one projection 124 of the second faying surface 120, as illustrated in FIG. 15. As such, when the intervening reaction material 214 is present, the projection 24 on the first faying surface 18 makes indirect contact with the second faying surface 20, 120 through the reaction material 214, whether or not the second faying surface 20, 120 includes the projection 124. The placement of the intervening reaction material 214 between the projection 24 on the first faying surface 18 and the second faying surface 20, 120 helps to keep the initial generation of concentrated heat focused within the joining location 76.

The intervening reaction material 214 helps to establish the metallurgical joint 90 by cleaning first and second faying surfaces 18, 20, 120 along their faying interface 22 within the joining location 76 so that the interaction between the faying surfaces 18, 20, 120 that leads to the metallurgical joint 90 can occur more readily. In particular, when the electric current is passed through the first and second copper workpieces 10, 12, 112, the intervening reaction material 214 heats up more rapidly due to its lower electrical conductivity and liquefies between the first and second faying surfaces 18, 20, 120. The liquefied reaction material is expelled laterally outwardly along the faying interface 22 as the projection 24 or projections 24, 124 collapse and the first and second faying surfaces 18, 20, 120 are brought closer together and into broader interfacial contact under the pressure of the applied compressive force 86. In so doing, the liquefied reaction material breaks down surface oxide films and clears the resultant oxide film remnants and other materials laterally outwardly, thus bringing cleaned portions of the first and second faying surfaces 18, 20, 120 into direct contact under the pressure of the applied compressive force 86 and in the locally heated environment fostered by the projection 24 on the first faying surface 18 or the projections 24, 124 on the first and second faying surfaces 18, 120. The cleaning action realized by the lateral displacement of the liquefied reaction material is at least partially attributable to the presence of phosphorus in the copper alloy, which acts as a flux when the reaction material 214 is melted. The intervening reaction material 214, in that regard, is self-fluxing.

The various embodiments of the disclosed method described above can be implemented in combination with each other, if desired. For example, intervening material 214 may be employed, or may not be employed, regardless of whether the electric current is passed through the first and second copper workpieces 10, 12, 112 using the resistance spot welding apparatus 16 of FIG. 1 or the resistance spot welding apparatus 116 of FIG. 11 that incorporates capacitive discharge to provide the electric current. In fact, the use of the resistance spot welding apparatus 116 of FIG. 11 in combination with the intervening reaction material 214 is likely to be able to establish the metallurgical joint 90 between the first and second copper workpieces 10, 12, 122 with the lowest overall energy input into the workpieces 10, 12, 112, which may be helpful in preventing thermal damage to nearby heat-sensitive materials that are in contact with the first and/or second copper workpieces 10, 12, 112. Similarly, the formation of the at least one projection 24, 124 on each of the first and second faying surfaces 18, 20, 120 may be employed with or without the intervening reaction material 214 and either of the resistance spot welding apparatuses 16, 116 described above may be used to pass the electrical current through the copper workpieces 10, 12, 112 and their respective projection 24, 124.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of joining together adjacent overlapping copper workpieces by way of resistance spot welding, the method comprising:
   providing a workpiece stack-up that includes a first copper workpiece and a second copper workpiece that lies adjacent to the first copper workpiece, the first copper workpiece having a first faying surface and the second copper workpiece having a second faying surface that confronts the first faying surface to establish a faying interface, and wherein the first faying surface includes a projection that ascends beyond a surrounding base surface of the first faying surface and makes contact with the second faying surface;

applying a compressive force against the first and second copper workpieces that urges the projection of the first faying surface against the second faying surface; and passing an electric current momentarily through the first and second copper workpieces, the electric current initially flowing through the projection included on the first faying surface to generate and concentrate heat within the projection prior to the projection collapsing to bring the first faying surface and the second faying surface into broader interfacial contact along the faying interface of the first and second copper workpieces, and, wherein, upon cooling of the first and second copper workpieces, a metallurgical joint is established between the first and second copper workpieces across their faying interface at a location where the projection collapsed.

2. The method set forth in claim 1, wherein the second faying surface also includes a projection that ascends beyond a surrounding base surface of the second faying surface.

3. The method set forth in claim 2, wherein the projection of the first faying surface and the projection of the second faying surface making contact with each other and are urged against each other when the compressive force is applied against the first and second copper workpieces, and wherein passing the electric current through the first and second copper workpieces includes initially flowing the electric current through the projections to generate and concentrate heat within the projections prior to the projections collapsing to bring the first faying surface and the second faying surface into broader interfacial contact along the faying interface of the first and second copper workpieces.

4. The method set forth in claim 1, wherein an intervening reaction material is disposed between the projection of the first faying surface and the second faying surface, wherein the intervening reaction material is a copper alloy that includes between 2.0 wt % and 10 wt % phosphorus.

5. The method set forth in claim 1, further comprising:
delivering an electric current to a capacitor bank to store energy in the capacitor bank; and
discharging the energy stored in the capacitor bank to provide the electric current that is passed momentarily through the first and second copper workpieces.

6. The method set forth in claim 1, wherein each of the first and second copper workpieces is comprised of 99.9 wt % copper or greater.

7. The method set forth in claim 1, further comprising:
forming the projection on the first faying surface before the first copper workpiece and the second copper workpiece are assembled into the workpiece stack-up.

8. The method set forth in claim 7, wherein forming the projection on the first faying surface comprises mechanically deforming the first copper workpiece to displace material of the first copper workpiece into the projection.

9. The method set forth in claim 7, wherein forming the projection on the first faying surface comprises depositing a copper material onto the first copper workpiece to form the projection without mechanically deforming the first copper workpiece.

10. A method of joining together adjacent overlapping copper workpieces by way of resistance spot welding, the method comprising:
forming at least one projection at a first faying surface of a first copper workpiece, the at least one projection of the first faying surface ascending beyond a surrounding base surface of the first faying surface;

assembling a workpiece stack-up that includes the first copper workpiece and a second copper workpiece that lies adjacent to the first copper workpiece, wherein the at least one projection of the first faying surface of the first copper workpiece makes contact with a second faying surface of the second copper workpiece;

applying a compressive force against the first and second copper workpieces that urges the at least one projection of the first faying surface against the second faying surface;

discharging energy stored in a capacitor bank to provide an electric current that rises to a peak current level of between 30 kA and 80 kA within a period of 2.0 ms to 10 ms and then decays over a time period of 5.0 ms to 20 ms before dropping to below 1 kA; and forming a metallurgical joint between the first and second copper workpieces by passing the electric current through the first and second copper workpieces, the electric current initially flowing through the at least one projection included on the first faying surface to generate and concentrate heat within the at least one projection prior to the at least one projection collapsing to bring the first faying surface and the second faying surface into broader interfacial contact, and, wherein, upon cooling of the first and second copper workpieces, the metallurgical joint is established between the first and second copper workpieces across their faying interface at a location where the at least one projection collapsed.

11. The method set forth in claim 10, wherein each of the first and second copper workpieces is comprised of 99.9 wt % copper or greater.

12. The method set forth in claim 10, further comprising:
forming at least one projection at the second faying surface of second copper workpiece, the at least one projection of the second faying surface ascending beyond a surrounding base surface of the second faying surface.

13. The method set forth in claim 12, wherein assembling the workpiece stack-up comprises bringing the at least one projection of the first faying surface and the at least one projection of the second faying surface into contact with one another so that applying the compressive force against the first and second copper workpieces urges the projections against one another and passing the electric current through the first and second copper workpieces includes initially flowing the electric current through the projections to generate and concentrate heat within the projections prior to the projections collapsing.

14. The method set forth in claim 10, further comprising:
placing an intervening reaction material between the first faying surface and the second faying so that the intervening reaction material is disposed between the at least one projection of the first faying surface and the second faying surface upon assembling the first copper workpiece and the second copper workpiece into the workpiece stack-up, the intervening reaction material being a copper alloy that includes between 2 wt % and 10 wt % phosphorus.

15. The method set forth in claim 14, wherein the intervening reaction material is a Cu—P—Ag alloy that includes copper and between 3 wt % and 8 wt % phosphorus and between 0.1 wt % and 20 wt % silver.

16. The method set forth in claim 10, wherein forming the at least one projection on the first faying surface comprises punching the first copper workpiece in which a punch is driven into the first copper workpiece from an opposite backside surface of the first copper workpiece to displace material of the first copper workpiece into the at least one projection.

17. The method set forth in claim 10, wherein forming the at least one projection on the first copper workpiece comprises depositing a copper material onto the first copper workpiece to form the at least one projection without mechanically deforming the first copper workpiece.

18. A method of joining together adjacent overlapping copper workpieces by way of resistance spot welding, the method comprising:
forming at least one projection at a first faying surface of a first copper workpiece, the at least one projection of the first faying surface ascending beyond a surrounding base surface of the first faying surface;
assembling a workpiece stack-up that includes the first copper workpiece and a second copper workpiece that lies adjacent to the first copper workpiece, wherein the at least one projection of the first faying surface of the first copper workpiece makes contact with a second faying surface of the second copper workpiece through an intervening reaction material, the intervening reaction material being a copper alloy that includes between 2 wt % and 10 wt % phosphorus and having an electrical conductivity that is lower than an electrical conductivity of each of the first and second copper workpieces;
applying a compressive force against the first and second copper workpieces that urges the at least one projection of the first faying surface against the second faying surface;
discharging energy stored in a capacitor bank to provide an electric current that rises to a peak current level of between 30 kA and 80 kA within a period of 2.0 ms to 10 ms and then decays over a time period of 5.0 ms to 20 ms before dropping to below 1 kA; and
passing the electric current through the first and second copper workpieces, the electric current initially flowing through the at least one projection included on the first faying surface to generate and concentrate heat within the at least one projection prior to the at least one projection collapsing to bring the first faying surface and the second faying surface into broader interfacial contact, the heat that is generated within the at least one projection causing the intervening material layer to liquefy and be laterally displaced between the first and second faying surfaces, and, wherein, upon cooling of the first and second copper workpieces, a metallurgical joint is established between the first and second copper workpieces across their faying interface at a location where the at least one projection collapsed.

19. The method set forth in claim 18, further comprising:
forming at least one projection at the second faying surface of the second copper workpiece, the at least one projection of the second faying surface ascending beyond a surrounding base surface of the second faying surface, and wherein:
assembling the workpiece stack-up comprises bringing the at least one projection of the first faying surface and the at least one projection of the second faying surface into indirect contact with one another through the intervening reaction material layer so that applying the compressive force against the first and second copper workpieces urges the projections against one another, and
passing the electric current through the first and second copper workpieces includes initially flowing the electric current through the at least one projection of the first faying surface and the at least one projection of the second faying surface to generate and concentrate heat within the projections prior to both of the projections collapsing to bring the first faying surface and the second faying surface into broader interfacial contact.

20. The method set forth in claim 18, further comprising:
contacting the first copper workpiece with a first copper alloy spot welding electrode;
contacting the second copper workpiece with a second copper alloy spot welding electrode that is facially aligned with the first copper alloy spot welding electrode;
applying the compressive force against the first and second copper workpieces by pressing the first and second copper alloy spot welding electrodes against the first and second copper workpieces, respectively; and
passing the electric current through the first and second copper workpieces by exchanging the electric current between the first and second copper alloy welding electrodes located on opposite sides of the workpiece stack-up.

* * * * *